United States Patent
Marks

(10) Patent No.: US 7,156,423 B2
(45) Date of Patent: Jan. 2, 2007

(54) PLASTIC TUBE JOINT

(75) Inventor: Nathan Marks, Savage, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/412,050

(22) Filed: Apr. 11, 2003

(65) Prior Publication Data

US 2004/0201212 A1 Oct. 14, 2004

(51) Int. Cl.
*F16L 13/00* (2006.01)

(52) U.S. Cl. .................. 285/21.1; 285/124.4; 285/256; 285/286.1

(58) Field of Classification Search .............. 285/21.1, 285/21.2, 124.1, 124.2, 124.3, 124.4, 124.5, 285/239–259, 286.1
See application file for complete search history.

(56) References Cited

U.S. PATENT DOCUMENTS

| | | | |
|---|---|---|---|
| 2,701,147 A * | 2/1955 | Summerville | 285/1 |
| 3,312,483 A | 4/1967 | Leadbetter et al. | |
| 3,312,484 A | 4/1967 | Davenport | |
| 3,583,710 A | 6/1971 | Burelle | |
| 3,669,475 A | 6/1972 | Luckenbill | |
| 3,695,643 A | 10/1972 | Schmunk | |
| 3,753,575 A * | 8/1973 | Tracy | 285/124.4 |
| 3,873,132 A * | 3/1975 | Czerwiak | 285/21.2 |
| 3,874,709 A | 4/1975 | MacDonald | |
| 3,884,513 A | 5/1975 | Gassert | |
| 3,893,716 A | 7/1975 | Moreiras | |
| 3,909,046 A | 9/1975 | Legris | |
| 3,929,359 A | 12/1975 | Schmunk | |
| 3,994,515 A | 11/1976 | Cotten | |
| 3,999,783 A | 12/1976 | Legris | |
| 4,005,883 A | 2/1977 | Guest | |
| 4,007,951 A * | 2/1977 | Legris | 285/124.5 |
| 4,022,499 A | 5/1977 | Holmes | |
| 4,037,864 A | 7/1977 | Anderson | |
| 4,049,034 A * | 9/1977 | Vcelka et al. | 222/566 |
| 4,072,328 A | 2/1978 | Elliott | |
| 4,123,090 A | 10/1978 | Kotsakis | |
| 4,146,254 A | 3/1979 | Turner et al. | |
| 4,178,023 A | 12/1979 | Guest | |
| 4,220,361 A | 9/1980 | Brandenberg | |
| 4,298,220 A | 11/1981 | Kukuminato | |
| 4,586,734 A | 5/1986 | Grenier | |
| 4,606,783 A | 8/1986 | Guest | |
| 4,611,832 A * | 9/1986 | Matsuoka et al. | 285/55 |
| 4,635,975 A | 1/1987 | Campbell | |
| 4,650,529 A | 3/1987 | Guest | |
| 4,722,560 A | 2/1988 | Guest | |
| 4,727,242 A | 2/1988 | Barfield | |

(Continued)

Primary Examiner—David Bochna
(74) Attorney, Agent, or Firm—Scott A. Bardell

(57) ABSTRACT

A connector assembly for creating a plastic tube joint in a length of plastic tubing having a distal end, a proximal end and a hollow lumen includes forming a flare in the tube proximate the proximal end thereof by means of a flared ferrule disposed in the lumen and defining a void between the flare and the proximal end of the tubing, the void being defined between the ferrule and a collet, the tubing contracting into the void, and forming a neck between the ferrule and the collet proximate the ferrule flare, the neck substantially permanently capturing the tubing contracted into the void; and substantially permanently bonding the collet to a connector body. A connector assembly for simultaneously forming a plastic tube joint in a pair of plastic tubes is further included as is a method for simultaneously forming a plastic tube joint in a pair of plastic tubes.

19 Claims, 7 Drawing Sheets

U.S. PATENT DOCUMENTS

| | | |
|---|---|---|
| 4,802,696 A | 2/1989 | Chohan |
| 4,810,009 A | 3/1989 | Legris |
| 4,826,218 A | 5/1989 | Zahuranec |
| 4,836,586 A | 6/1989 | Martin |
| 4,869,533 A | 9/1989 | Lehmann |
| 4,946,213 A | 8/1990 | Guest |
| 5,085,472 A | 2/1992 | Guest |
| 5,150,923 A | 9/1992 | Ohya |
| 5,150,926 A | 9/1992 | Egli |
| 5,230,539 A | 7/1993 | Olson |
| 5,292,157 A | 3/1994 | Rubichon |
| 5,332,269 A | 7/1994 | Homm |
| 5,375,889 A | 12/1994 | Nakashiba |
| 5,462,313 A * | 10/1995 | Rea et al. .................. 285/21.1 |
| 5,511,830 A | 4/1996 | Olson |
| 5,542,717 A | 8/1996 | Rea |
| 5,553,901 A | 9/1996 | Serot |
| 5,564,757 A | 10/1996 | Seabra |
| 5,573,279 A | 11/1996 | Rea |
| 5,584,513 A | 12/1996 | Sweeny |
| 5,593,186 A | 1/1997 | Harris |
| 5,603,530 A | 2/1997 | Guest |
| 5,607,193 A | 3/1997 | Guest |
| 5,683,120 A | 11/1997 | Brock |
| 5,772,263 A | 6/1998 | Lewis |
| 5,775,742 A | 7/1998 | Guest |
| 5,779,284 A | 7/1998 | Guest |
| 5,873,610 A | 2/1999 | Szabo |
| 5,887,911 A | 3/1999 | Kargula |
| 5,909,902 A | 6/1999 | Seabra |
| 6,056,326 A | 5/2000 | Guest |
| 6,065,779 A | 5/2000 | Moner |
| 6,118,108 A | 9/2000 | Ufford |
| 6,145,894 A | 11/2000 | Myers |
| 6,149,206 A | 11/2000 | DiRocco |
| 6,173,999 B1 | 1/2001 | Guest |
| 6,183,022 B1 | 2/2001 | Guest |
| 6,217,084 B1 | 4/2001 | Larsson |
| 6,224,117 B1 | 5/2001 | Olson |
| 6,264,250 B1 | 7/2001 | Teraoka |
| 6,267,416 B1 | 7/2001 | Ferreira |
| 6,276,728 B1 | 8/2001 | Treichel |
| 6,302,451 B1 | 10/2001 | Olson |
| 6,312,019 B1 | 11/2001 | Nakazumi |
| 6,334,634 B1 | 1/2002 | Osterkil |
| 6,347,815 B1 | 2/2002 | Kargula |
| 6,390,511 B1 | 5/2002 | Kargula |
| 6,464,266 B1 | 10/2002 | O'Neill et al. |
| 6,517,124 B1 | 2/2003 | Le Quere |

* cited by examiner

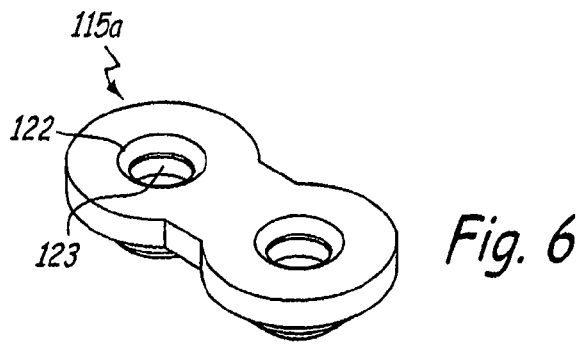
Fig. 6
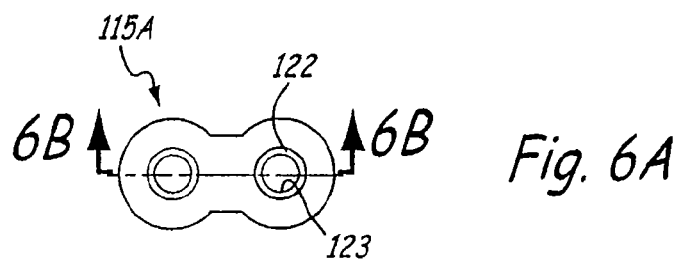
Fig. 6A
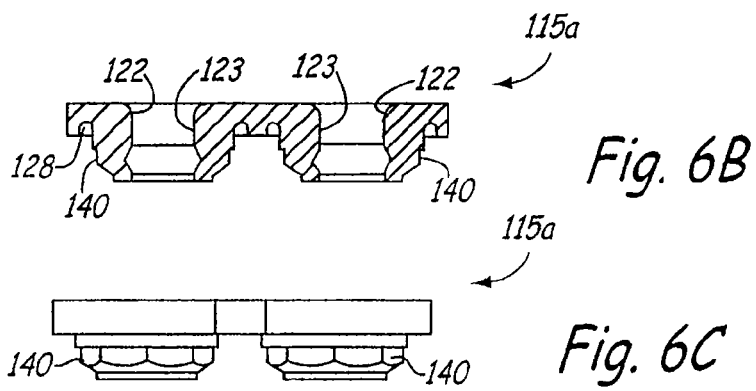
Fig. 6B
Fig. 6C
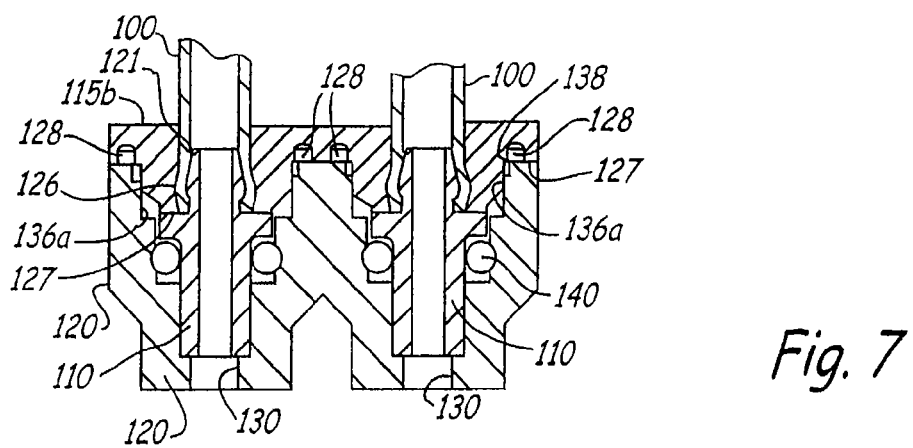
Fig. 7

PLASTIC TUBE JOINT

FIELD OF THE INVENTION

The present invention relates generally to the field of forming joints for plastic tubing. More specifically, the present invention relates to a method of forming a permanent, leak-proof joint with plastic tubing, particularly plastic tubing made of high performance polymers.

BACKGROUND OF THE INVENTION

Since its invention, plastic tubing has increasingly been used in residential, commercial and industrial applications that were previously the domain of brass, copper and steel tubing. Plastic tubing offers many advantages over its metal predecessors. Plastic tubing is extremely flexible allowing for quick and easy installation as compared to metal tubing. In the case of demanding applications, the wide variety of available plastic polymers allows a user to select chemically inert and resistant tubing to meet the unique requirements of their application. Finally, nearly anyone can install plastic tubing as it does not require the skill set that typical metal tubing installations require.

A variety of methods have been developed for creating joints with plastic tubing. Most methods involve mechanical couplings providing temporary connections. Because the typical mechanical connection functions only due to a temporary mechanical seal, the potential for leaking is present when using such connections. Examples of these types of mechanical connections include the use of ferrules with a crimp process, push-style fittings such as those manufactured by John Guest International Ltd. and threaded style compression fittings such as those manufactured by JACO Manufacturing Company.

When users confront demanding applications, users typically select the appropriate tubing based on the polymer which best provides characteristics for their application. Many users will select specialty plastic polymers such as Polyvinylidene Fluoride (PVDF), Teflon® and cross-linked Polyethylene (PEX) when the demands of the application requires concern for chemical compatibility or elevated temperature issues. Unfortunately many of the characteristics which make the use of specialty plastics desirable also lead to difficulties when a user attempts to create tubing joints. Subsequently, the user's ability to create permanent, leak-proof joints with these specialty plastics exceeds the problems associated with more standard polymers such as nylon, polyethylene and polypropylene.

An example of the types of problems associated with creating permanent, leak-proof joints is demonstrated by PEX tubing. There are several methods of manufacturing PEX. The fundamental result is that the molecular chains of polyethylene are cross-linked resulting in a polymer that shows strength and durability over a wide temperature range. Unfortunately, this strength and durability prevents PEX from exhibiting the chemical and adhesive bonding traits that are common with other polymers. Because of this limitation, a variety of mechanical means for creating joints with PEX tubing have been developed. These means typically include crimping means and metal tubing inserts.

An example of such mechanical means include the Vanguard CRIMPSERT™ metallic insert fitting. The CRIMPSERT™ fitting uses insert fittings and crimp rings made of copper or brass. Using a crimping tool, the user is able to mechanically seal the joint.

Another example of such mechanical sealing means includes the Wirsbo ProPEX® fitting system. The ProPEX® system uses the shaped-memory characteristic of PEX. An expander tool is used to expand an end of the PEX tubing. An insert fitting is inserted into this expanded tubing and the expander tool is then removed. The tubing returns to its original shape thereby compressing and holding the insert fitting in place.

While mechanical sealing means may be suitable for creating joints in plastic tubing for residential and commercial installations, these mechanical sealing means provide little value in large volume commercial and manufacturing settings. What is required is a joint allowing for quick, repeatable and permanent connection of plastic tubing joints.

SUMMARY OF THE INVENTION

The joint forming technique of the present invention satisfies the requirements for sealing plastic tubing in high volume settings regardless of the tubing polymer composition. The present invention preferably makes use of locally generated ultrasonic energy to create a permanent joint between plastic tubing and various fitting components.

The preferred embodiment includes a fitting component to be used in connecting and sealing plastic tubing with non-tubing assemblies. The invention preferably makes use of ultrasonic welding, either spin welding or shear welding, but most preferably, shear welding. Presently, the components of the preferred embodiment are formed by injection molding thermoplastic material. Satisfactory results have been achieved using ABS for the collet and connector body and PPO (ploypheilene oxide) for the ferrule. Such a device allows for high volume use of the invention while at the same time maintaining a high degree or repeatability. Examples of assemblies in which the embodiment could be practiced include water filtration equipment, appliances and plumbing connections.

The present invention is a connector assembly for creating a plastic tube joint in a length of plastic tubing having a distal end, a proximal end and a hollow lumen. The connector assembly includes forming a flare in the tube proximate the proximal end thereof by means of a flared ferrule disposed in the lumen and defining a void between the flare and the proximal end of the tubing, the void being defined between the ferrule and a collet, the tubing contracting into the void, and forming a neck between the ferrule and the collet proximate the ferrule flare, the neck substantially permanently capturing the tubing contracted into the void; and substantially permanently bonding the collet to a connector body. The present invention is further a connector assembly for simultaneously forming a plastic tube joint in a pair of plastic tubes and is also a method for simultaneously forming a plastic tube joint in a pair of plastic tubes.

BRIEF DESCRIPTION OF THE DRAWINGS

FIG. 2b is a sectional view of the ferrule taken along the line B—B of FIG. 2a;

FIG. 6 is a perspective view of the double collet;

FIG. 6a is planar elevational view of the double collet;

FIG. 6b is a sectional view of the double collet taken along the line B—B of FIG. 6a;

FIG. 6c is a side elevational view of the double collet; and

FIG. 7 is a sectional view of a further embodiment of the connector assembly of the present invention;

DETAILED DESCRIPTION OF THE DRAWINGS

Figure 1:
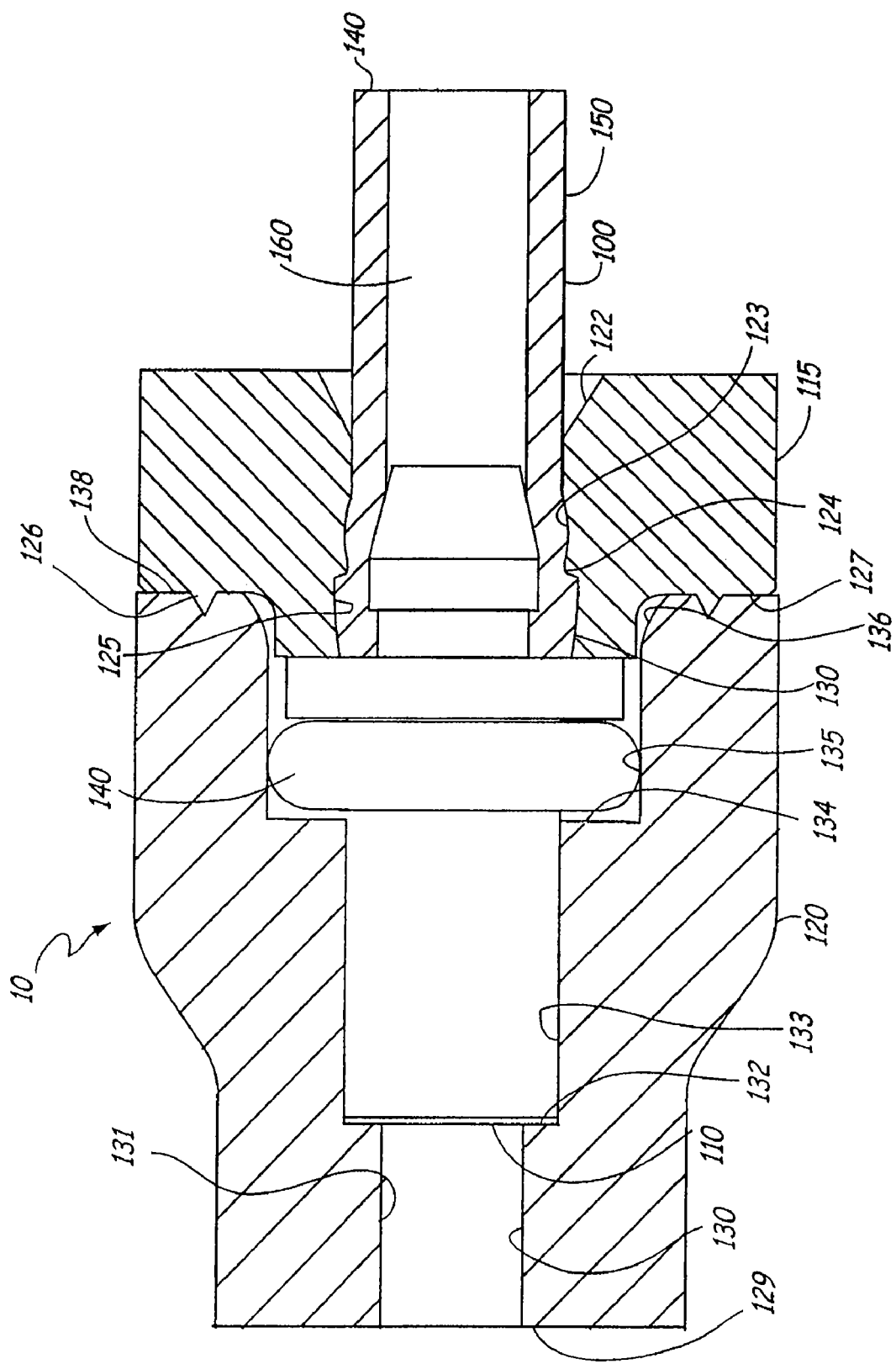
FIG. 1 is a sectional side view of the connector assembly of the present invention.

The connector assembly of the present invention is shown generally at 10 in the figures. The connector assembly 10 is used for permanently connecting a plastic tube 100 to another device. A first embodiment of the connector assembly 10 is comprised of ferrule 110, collet 115, and connector body 120, as depicted in FIG. 1.

Plastic tubing 100 is defined by proximal end 130 and distal end 140. Plastic tubing 100 comprises tube wall 150 and a hollow lumen 160. The plastic tubing 100 is preferably formed of a pliable, resilient plastic material.

Figure 2:
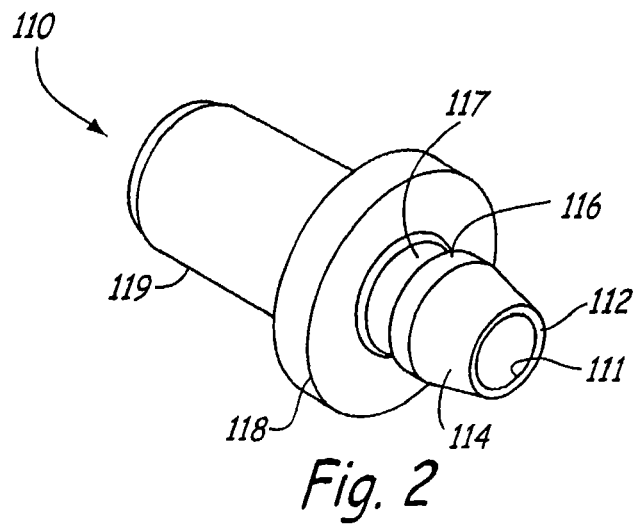
FIG. 2 is a perspective view of the ferrule.
Figure 2A:
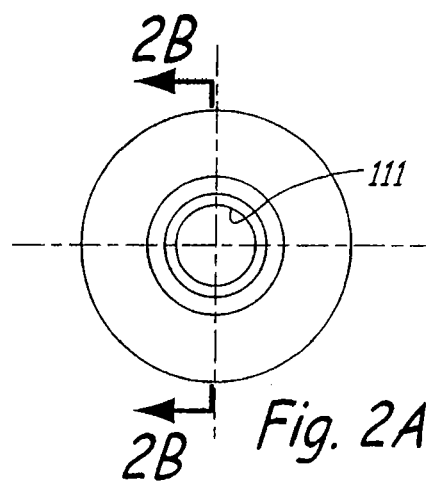
FIG. 2a is a first end view of the ferrule.
Figure 2B:
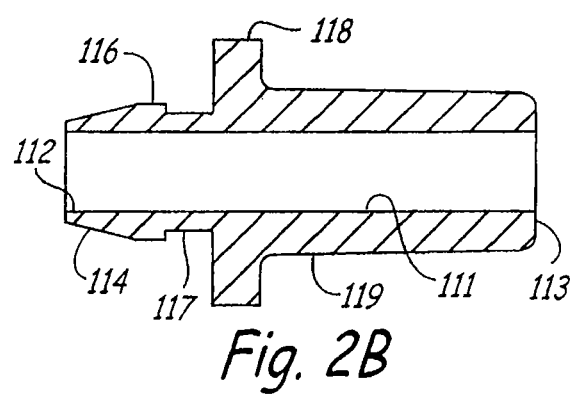
Figure 2C:
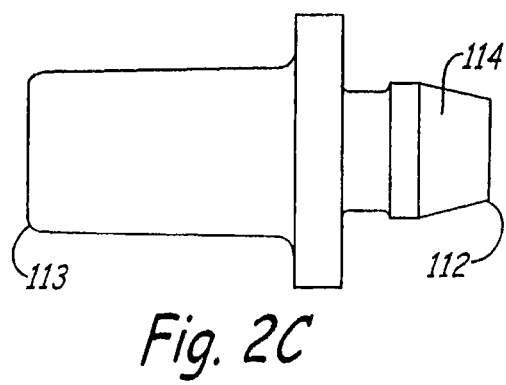
FIG. 2c is a side elevational view of the ferrule.

The ferrule 110 is preferably made of a plastic material, a noted above. Referring to FIGS. 2–2c, the ferrule 100 has a central bore 111 defined concentric with the longitudinal axis thereof. The ferrule 110 has a tubing end 112 and an opposed connector end 113. The external margin of the ferrule 110 has a flared section 114 extending inward from the tubing end 112 to a first cylindrical section 116. The first cylindrical section 116 is connected by a step to a second cylindrical section 117. The second cylindrical section 117 has a reduced diameter as compared to the diameter of the first cylindrical section 116. The second cylindrical section 117 is connected to a flange 118, having a diameter that is significantly greater than both of the cylindrical sections 116, 117. A very slightly tapered section 119 extends from the flange 118 to the connector end 113 of the ferrule 110.

A seal 140 may be placed on the tapered section 119 and abutted to the flange 118, as depicted in FIG. 1. The seal 140 may be an elastomeric O-ring.

Figure 3:
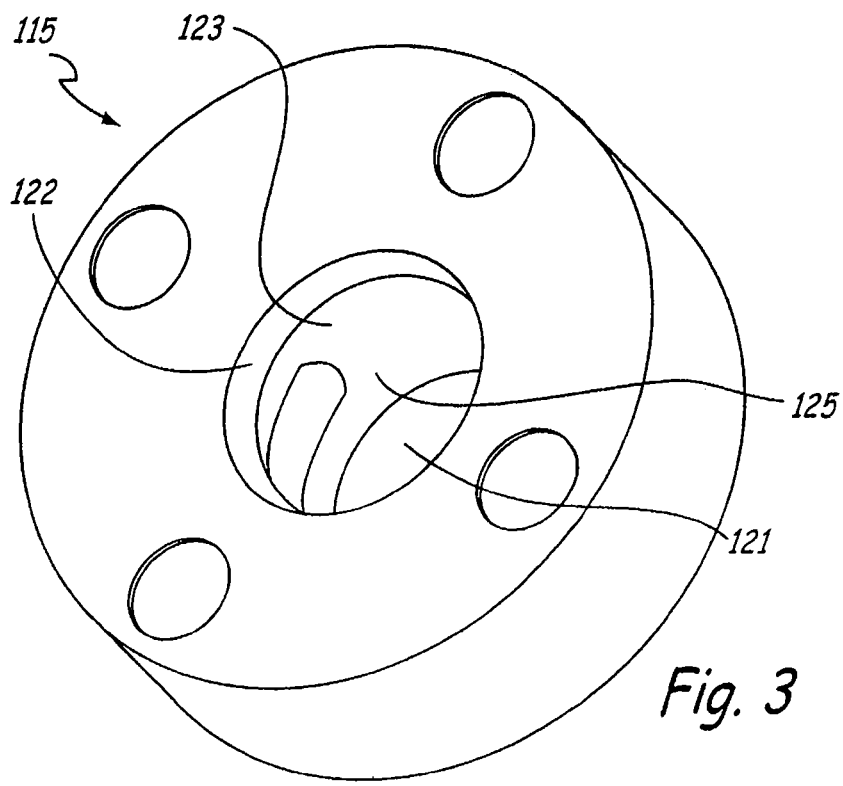
FIG. 3 is a first perspective view of the collet.
Figure 4:
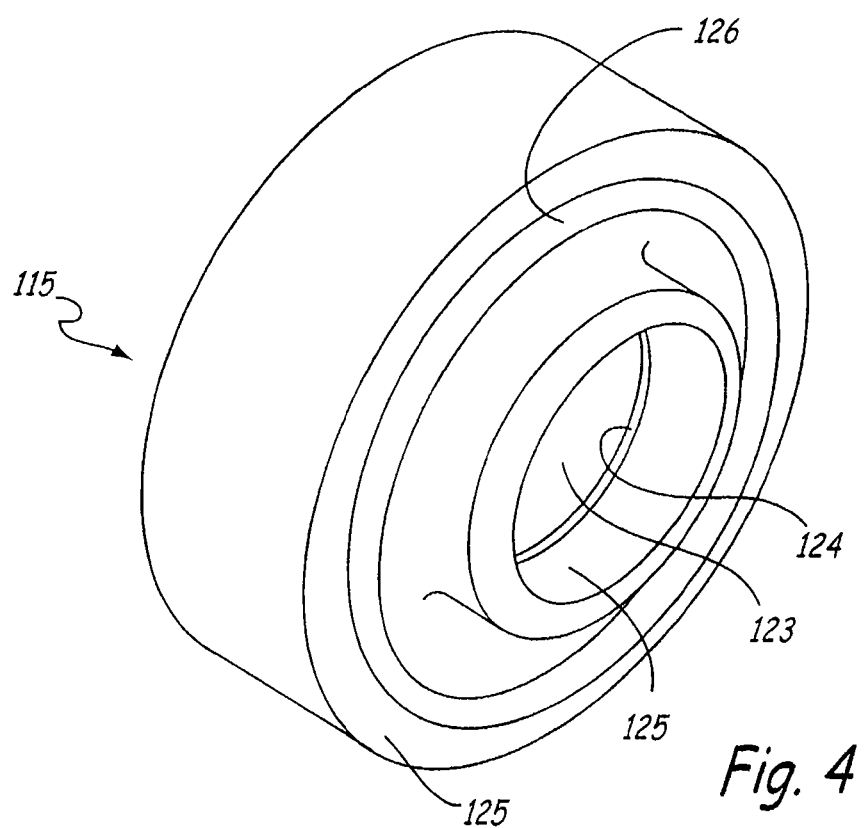
FIG. 4 is a second perspective view of the collet.

Referring to FIGS. 1, 3, and 4, the collet 115 is also preferably formed of a plastic material as noted above and is generally ring shaped. More specifically, the collet 115 has an axial bore 121 defined therethrough. The bore 121 has a flared entrance 122. The flared entrance 122 is coupled to a short, generally cylindrical first section 123. The first section terminates in a shallow step 124. The step 124 is connected to a second section 125 that is also generally cylindrical and has a slightly greater diameter than the first section 123.

The collet end margin 127 is generally planar, but has a circular energy director 126 formed thereon that may be triangular in cross section, having an elevated peak.

FIG. 1 depicts the connector body 120. The connector body 120 is preferably made of a plastic material as noted above and may b formed integral to a device to which it is desired to connect the tube 100, such as, for example, the manifold of a filter assembly. The connector body 120 may as well be operably coupled to such device by bonding thereto or otherwise connecting thereto.

The connector body 120 has a central longitudinal bore 130. The bore 130 has a generally cylindrical section 131 coupled to the distal end 129 of the connector body 120. Bore section 131 terminates at step 132 connected to generally cylindrical section 133. Section 133 has a greater diameter than section 131. Bore section 133 terminates at step 134 connected to generally cylindrical section 135. Section 135 has a greater diameter than section 133. Section 135 flares outward at flared section 136 to proximal end 138 of the connector body 120. The proximal end 138 is generally planar and may have a textured surface to promote the bonding thereof.

In assembly, the ferrule 110 with the seal 140 in place is inserted into the bore 130 of the connector body 120. The seal is preferably radially compressed between the exterior margin of the ferrule and the bore section 135 of the bore 130. The flange 118 does not necessarily, but may sealingly compress the seal 140 between the flange 118 and the step 134 and bore section 135 of the connector body 120.

The proximal end 130 of the tubing 100 is slid over the taper 114. The taper 114 expands the tubing 100 radially outward. The tubing 100 is forced leftward, as depicted in FIG. 1, until the proximal end 130 abuts the side margin of the flange 118. The resilient tubing 100 contracts to its original shape after passing over the taper 114 into contact with the second cylindrical section 117.

Following the placement of the ferrule 100 with the plastic tubing 100 into bore 130, a leftward directed biasing force is applied to both the plastic tubing 100 and the collet 115. The collet 115 is forced leftward by a compression device, comprising a piston or similar force applicator. The energy director 126 is forced into contact with the preferably textured proximal end 138 of the connector body 120. The shallow step 124 compressively engages the tubing 100 and forms a narrow neck in cooperation with the surface 116 of the ferrule 110, thereby capturing the portion of the tubing 100 that has contracted around the cylindrical surface 117.

While maintaining intimate contact between the collet 115 and the connector body 120, the user activates an ultrasonic generator (not shown). Activating the ultrasonic generator causes the interface between the collet 115 and the connector body 120 at surfaces 127, 138 to be heated. Heating is enhanced by the energy director 126 being forced into contact with the preferably textured proximal end 138 of the connector body 120. The heating efficiently softens and deforms the energy director 126 and promotes efficient bonding with the preferably textured proximal end 138. The heat in cooperation with the leftward directed force on the tubing 100 further causes the proximal end of the tubing 100 to soften and to further fill the void defined adjacent to the flare 114 by the cylindrical surface 117 and the flange 118 of the ferrule 110, and the cylindrical surface 125 of the collet 115. The application of heat by the ultrasonic energy causes melting proximate surfaces 127, 138 and subsequent cooling substantially permanently bonds the collet 115 to the connector body 120 and substantially permanently and mechanically captures the tubing 110 between the collet 115 and the ferrule 110. The tubing 100 may not be withdrawn with any reasonable force application. This is a mechanical tube connection with no chemical connection between the tube 100 and ferrule 110, collet 115, and/or connector body 120.

Figure 5:
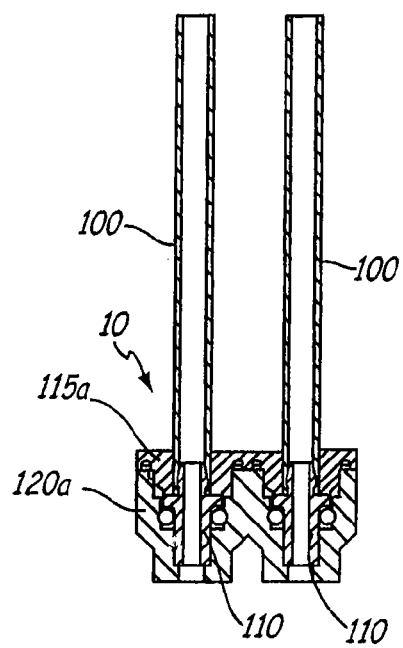
FIG. 5 is a sectional side view of a second embodiment of the connector assembly of the present invention.
Figure 5B:
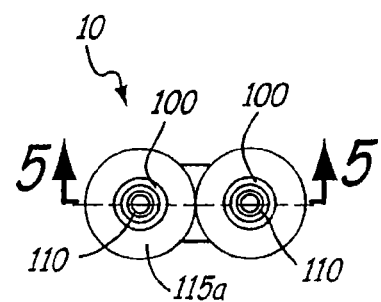
FIG. 5b is an end view of the embodiment of FIG. 5.
Figure 5C:
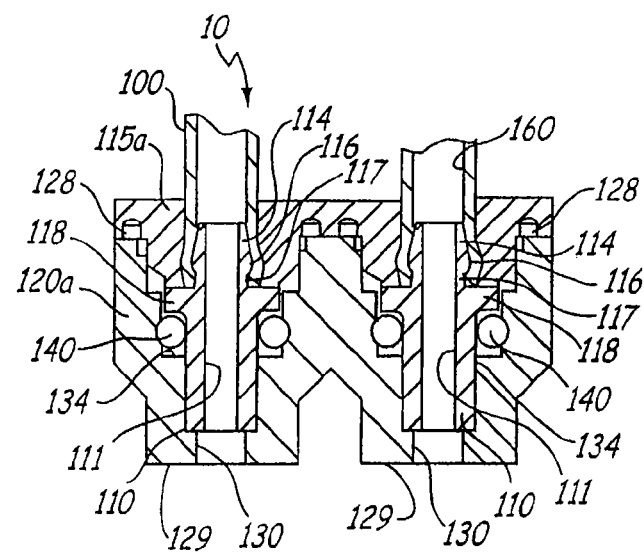
FIG. 5c is a sectional view of the connector assembly taken along the line B—B of FIG. 6b.
Figure 8:
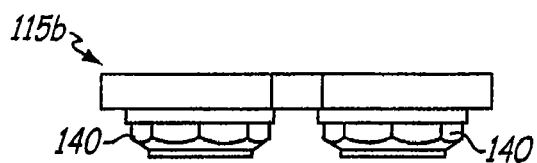
FIG. 8 is a side elevational view of the collet employed with the connector assembly of FIG. 7.
Figure 9:
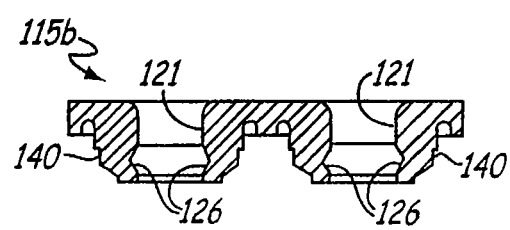
FIG. 9 is a sectional view of the collet of FIG. 8.

FIGS. 5 and 6 depict a further embodiment of the present invention useful for simultaneously joining two tubes 100 to a connector body 120a. In this embodiment of the connector assembly 10, the collet 115a and the connector body 120a are formed with dual receptacles for a pair of tubes 100. The two ferrules 110 are formed identical to the ferrules 110 noted above. The various features of the collet 115a and the connector body 120a are as noted above with respect to the single tube 100 embodiment. Operation to effect the joining of the pair of tubes 100 to the connector body 120a is the same as noted above with respect to joining a single tube 100 to the connector body 120. The advantage of this embodiment is the elimination of a joining procedure where two tubes 100 are used in close proximity.

A further embodiment of the present invention is depicted in FIGS. 7–12. The connector assembly 10 of FIGS. 7–11 includes numerals identifying a common assembly component that are the same as the numerals noted above.

Figure 10:
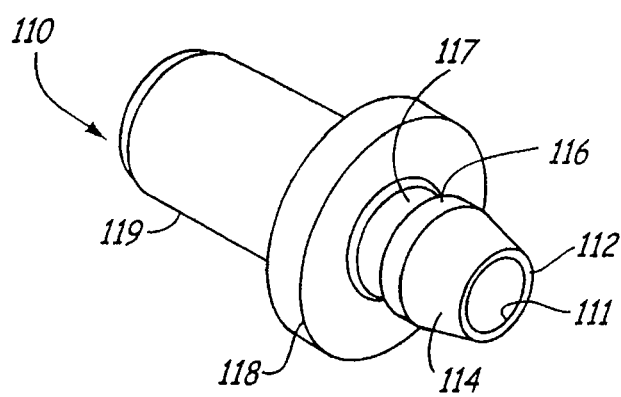
FIG. 10 is a perspective view of the ferrule.
Figure 11:
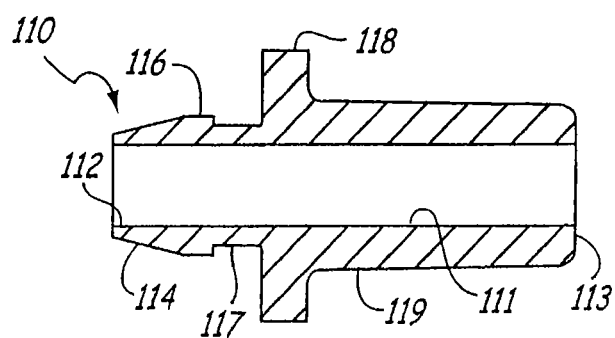
FIG. 11 is a sectional view of the ferrule of FIG. 10.
Figure 12:
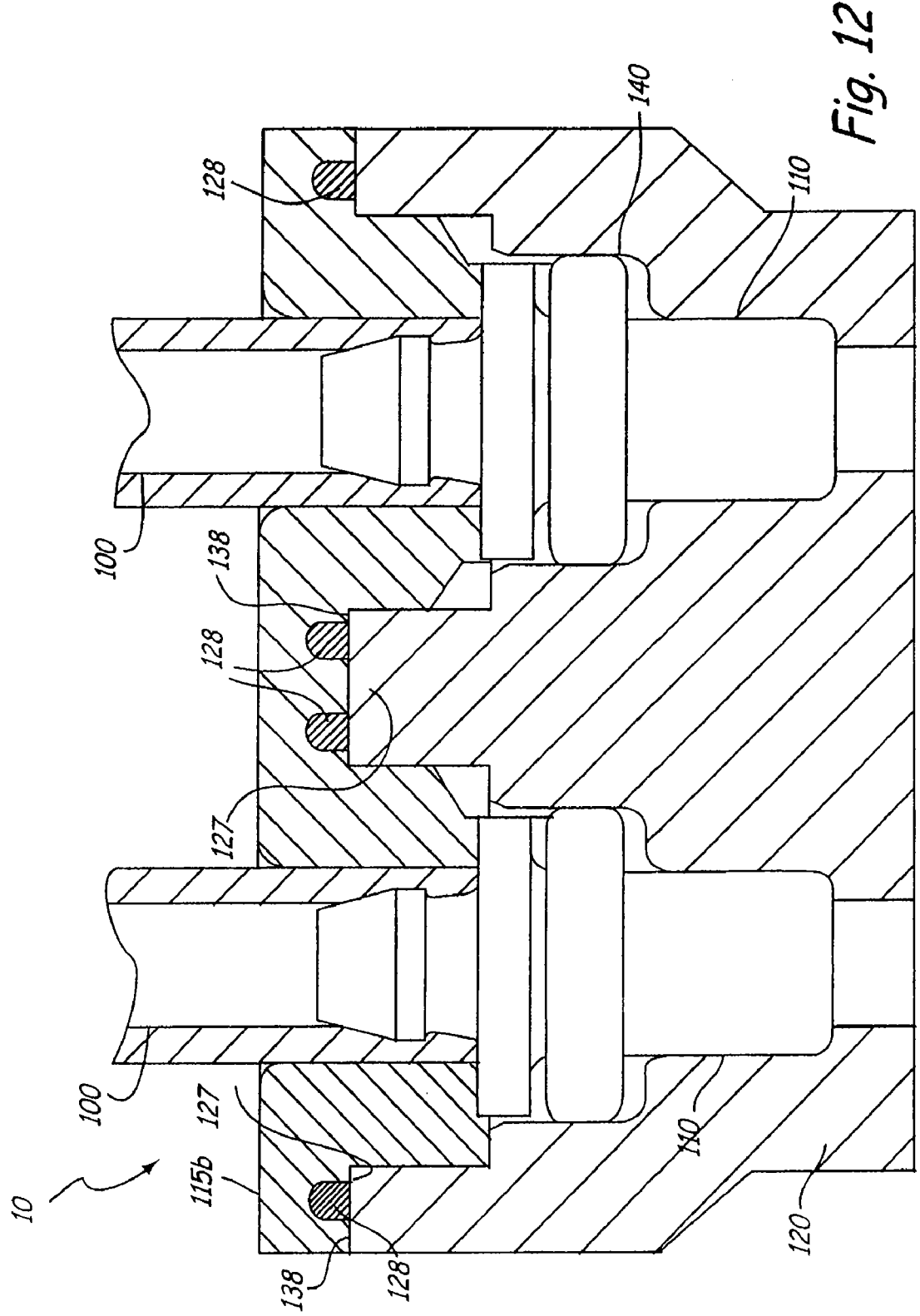
FIG. 12 is a sectional view of the connector assembly.

Accordingly, the ferrule 110, depicted in FIGS. 7, 10 and 11, is virtually identical to the ferrule 110 described above.

The collet 115b differs in certain respect from the collets 115 and 115a noted above. The collet 115b has a generally planar end margin 127. Preferably, the end margin 127 has a relatively rough surface. A circular scavenger groove 128 is defined in the end margin 127.

The bore 121 of collet 115b includes an indent 126. When the collet 115b is mated to the ferrule 110, the indent 126 is generally opposite the flared section 114 and adjacent cylindrical section 116 of the ferrule 110. The space between the indent 126 and the flared section 114 and first cylindrical section 116 defines a generally expanded path through which the plastic tube 100 must pass, the path contracted downstream of the expansion.

The collet 115b has a pair of hexagonal margins 140 that define a portion of the exterior margin of the collet 115b. A respective hexagonal margin 140 is concentric with a respective bore 121 defined in the collet 115b.

The connector body 120 depicted in FIG. 7 includes a hexagonal bore portion 136a that forms an end portion of the bore 130.

In assembly, when the collet 115b is mated to the connector body 120 the hexagonal margin 140 of the collet 115b resides closely within the hexagonal bore portion 136a of the connector body 120. In this manner, alignment of the collet 115b with the connector body 120 is assured.

The tube connection is effected as noted above. A force is exerted upon the collet 115b at the same time that sonic energy is applied. The roughness of the surfaces 127, 138 promotes melting at the interface of the surfaces 127, 138. This melting in conjunction with the force exerted on the collet 115b causes the collet to move closer to the connector body 120 about 0.050 inches. Melt that is generated at the interface of the surfaces 127, 138 then flows into the scavenger groove 128. Subsequent cooling causes bonding between the collet 115b and the connector body at the interface of the surfaces 127, 138 and by means of the melted material exposed within the scavenger groove 128. In this manner, the plastic tube 100 is mechanically captured between the ferrule 110 and collet 115b.

It will be obvious to those skilled in the art that other embodiments in addition to the ones described herein are indicated to be within the scope and breadth of the present application. Accordingly, the applicant intends to be limited only by the claims appended hereto.

The invention claimed is:

1. A connector assembly comprising:
   a tubing having an end;
   a fluid conduit having a connector element comprising:
      an exterior surface;
      a tip at the end of the fluid conduit;
      a radially oriented indentation adjacent the tip;
      an attachment surface facing toward the tip; and
   a collet comprising a structure with an opening and with a connection surface through which the opening extends and comprising a heat bonding polymer,
   wherein the end of the tubing extends over the connector element at the tip and wherein the collet opening is operatively positioned over the tubing on the connector element holding the tubing on the connector element and the connection surface of the collet being permanently operatively connected to the attachment surface of the connector element.

2. The connector assembly of claim 1 wherein the tip is tapered.

3. The connector assembly of claim 1 wherein the connector element comprises:
   a ferrule having a central channel aligned with the fluid conduit;
   a tubing end; and
   a connector end,
   the tip being located on the tubing end, and wherein the tubing extends over the tubing end.

4. The connector assembly of claim 3 wherein the ferrule comprises:
   a protruding section;
   a taper at the tubing end; and
   a radial indentation between the protruding section and the taper.

5. The connector assembly of claim 4 wherein the connector element comprises:
   a bore connected to the fluid conduit; and
   a seal, the bore further comprising;
      a sealing surface, wherein the connector end of the ferrule is operatively positioned within the bore and the seal is operatively positioned between the sealing surface and the protruding section to prevent fluid flow front the central channel to the exterior surface.

6. The connector assembly of claim 5 wherein the seal comprises an elastomeric o-ring.

7. The connector assembly of claim 5 wherein the attachment surface is located at the end of the bore.

8. The connector assembly of claim 7 wherein the front surface of the collet comprises a polymer, wherein the attachment surface of the connector element comprises a polymer and wherein the front surface is welded to the attachment surface.

9. The connector assembly of claim 1 wherein the collet further comprises:
   a flared entrance adjacent the connector element.

10. The connector assembly of claim 1 wherein the collet has a generally ring shape.

11. The connector assembly of claim 1 wherein the collet further comprises:
   a circular energy director.

12. The connector assembly of claim 1 wherein the collet comprises a plastic.

13. The connector assembly of claim 1 wherein the tubing comprises an elastic end.

14. The connector assembly of claim 1 further comprising:
   a second tubing having an end; and
   a second fluid conduit having a second connector element comprising;
      an exterior surface; and
      a tip, wherein the second tubing extends over the second connector element at the tip of the second connector element, and wherein the collet further comprises:
  a second opening operatively positioned over the second tubing on the connector element holding the second tubing on the second connector element.

15. The connector assembly of claim 14 wherein the collet comprises:
  a circular energy director adjacent each opening.

16. The connector assembly of claim 1 wherein the connection surface of the collet comprises a polymer, wherein the attachment surface of the connector element comprises a polymer, and wherein the connection surface is welded to the attachment surface.

17. A connector assembly comprising:
  a tubing having an end;
  a fluid conduit having a connector element comprising:
    an exterior surface;
    a tip at the end of the fluid conduit;
    an attachment surface the facing toward the tip; and
  a collet comprising a structure with an opening and with a connection surface through which the opening extends and comprising a heat bonding polymer and having a flared entrance adjacent the connector element,
  wherein the end of the tubing extends over the connector element at the tip and wherein the collet opening is operatively positioned over the tubing on the connector element holding the tubing on the connector element and the connection surface of the collet being permanently operatively connected to the attachment surface of the connector element.

18. A connector assembly comprising:
  a tubing having an end;
  a fluid conduit having a connector element comprising:
    an exterior surface;
    a tip at the end of the fluid conduit;
    an attachment surface facing toward the tip; and
  a generally ring shaped collet comprising a structure with an opening and with a connection surface through which the opening extends and comprising a heat bonding polymer,
  wherein the end of the tubing extends over the connector element at the tip and wherein the collet opening is operatively positioned over the tubing on the connector element holding the tubing on the connector element and the connection surface of the collet being permanently operatively connected to the attachment surface of the connector element.

19. A connect or assembly comprising:
  a tubing having an end;
  a fluid conduit having a connector element comprising:
    a tip at the end of the of the fluid conduit; and
    a ferrule comprising a protruding section, a taper at the tubing end, a radial indentation between the protruding section and the taper and having a central channel aligned with the fluid conduit;
    a tubing end; and
    a connector end, the tip being located on the tubing end, and wherein the tubing extends over the tubing end; and
  a collet comprising a structure with an opening and with a connection surface through which the opening extends and comprising a heat bonding polymer,
  wherein the end of the tubing extends over the connector element at the tip and wherein the collet opening is operatively positioned over the tubing on the connector element holding the tubing on the connector element and the connection surface of the collet being permanently operatively connected to the attachment surface of the connector element.

* * * * *

UNITED STATES PATENT AND TRADEMARK OFFICE
CERTIFICATE OF CORRECTION

PATENT NO.         : 7,156,423 B2
APPLICATION NO. : 10/412050
DATED              : January 2, 2007
INVENTOR(S)       : Nathan Marks It is certified that error appears in the above-identified patent and that said Letters Patent is hereby corrected as shown below:

Column 2, line 33 – delete "ploypheilene" and insert --polyphenylene--;
Column 6, line 38 – delete "front" and insert --from--; and
Column 8, line 13 – delete "connect or" and insert --connector--.

Signed and Sealed this

Twenty-ninth Day of May, 2007

JON W. DUDAS
*Director of the United States Patent and Trademark Office*